Figure 1:
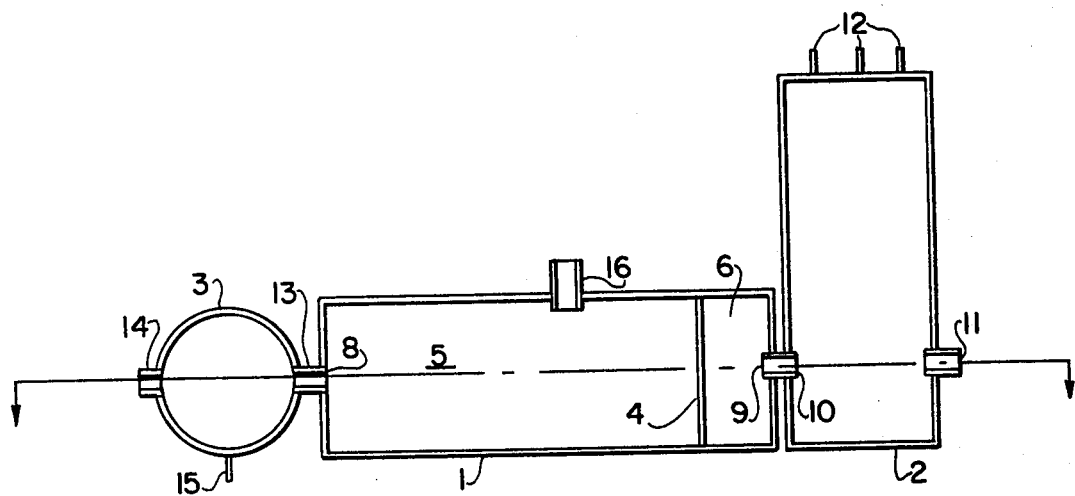

United States Patent [19]

Lenoir et al.

[11] 4,083,717

[45] Apr. 11, 1978

[54] SEPARATION OF THREE METALLURGICAL PHASES BY DECANTATION

[75] Inventors: Pierre Lenoir, Edegem; André L. Delvaux, Berchem, both of Belgium

[73] Assignee: Metallurgie Hoboken-Overpelt, Brussels, Belgium

[21] Appl. No.: 707,145

[22] Filed: Jul. 20, 1976

[30] Foreign Application Priority Data

Jul. 21, 1975  France .................................. 75 22711

[51] Int. Cl.$^2$ .............................................. C22B 13/00
[52] U.S. Cl. ............................................ 75/77; 65/19; 210/513
[58] Field of Search ............... 210/513, 519, 522, 537, 210/540, 83, 84; 75/77; 65/19

[56] References Cited

U.S. PATENT DOCUMENTS

| 1,851,030 | 3/1932 | Adams | 210/513 X |
| 2,747,680 | 5/1956 | Kilpatrick | 210/513 X |
| 2,946,443 | 7/1960 | Schmidt | 210/513 X |
| 3,862,040 | 1/1975 | Preus et al. | 210/540 X |
| 3,971,719 | 7/1976 | Peter | 210/540 X |

*Primary Examiner*—Frank A. Spear, Jr.
*Assistant Examiner*—E. Rollins Cross
*Attorney, Agent, or Firm*—Fred Philpitt

[57] ABSTRACT

The present invention relates to a process for the separation of three metallurgical phases by decantation.

7 Claims, 2 Drawing Figures

SEPARATION OF THREE METALLURGICAL PHASES BY DECANTATION

The process of the invention is particularly well suited for the separation of the slag-matte-bullion phases produced in a reduction furnace for lead bearing materials.

It is common practice in the metallurgy of lead to separate in one single and main operation slag, matte and bullion leaving e.g. a shaft furnace. A forehearth of the communicating vessels type usually called "siphon forehearth" is used to this purpose. Such forehearth consists essentially of one chamber, the upper part of which is subdivided into two adjoining compartments separated by a partition.

The phases to be separated are made to flow in a first of the two aforesaid compartments in which the less dense phase, i.e. the slag, floats on the top while the densest phase, i.e. the bullion, settles on the bottom of the chamber and the matte which deposits on the bullion is forced into the second of the aforesaid compartments under the pressure exerted by the matte and slag column which formed in the first compartment. The slag of the first compartment is removed by means of a weir in a direction which is substantially the same as the one in which the phases to be separated flow into this compartment. The two other phases are drawn off periodically, the bullion through a tap-hole in the lower part of the chamber and the matte through a tap-hole in the second compartment.

The phases separated in this way are further treated as follows:

Through aforesaid weir, the slag runs out into a carriage called "slag-carriage," in which there are two tap-holes, one near the bottom, the other 15 cm higher. When the carriage is filled, it is removed and another carriage takes its place under the weir; the lower tap-hole of the filled carriage is opened to draw off the matte which the slag carried along mechanically; as soon as this is done, the lower tap-hole is plugged and the carriage is emptied through the upper tap-hole into conical pots in which the slag solidifies and cools off; finally, the carriage is turned over to recover the slag still sticking to the bottom and the sides of the carriage, usually called "slag scale".

Through the tap-hole of the aforesaid second compartment, the matte is drawn off into flat moulds.

Through the said bullion tap-hole, the bullion flows into pots. Since the separation of matte and bullion if far from being perfect in the forehearth, specially when the reduction rate in the shaft furnace has been low, a matte layer floats on the top of the said pots. This matte layer is removed from the pots by means of wooden scrapers, producing in this way "matte dross".

Then there may be in the pots formation of a cover consisting either of a segregation product called "alloy", or of a segregation product called "speiss". Finally there is formation in the pots of a cover consisting of segregation products usually called "schlicker." After the removal of this schlicker, impure lead usually called "work-lead" remains in the pots.

The matte from the slag carriages, the slag scales, slag which is too rich in matte and bullion (averaging 35 to 40 percent of the produced slag), the matte dross and the schlickers have to be retreated in the shaft furnace.

Besides its complexity and its low separation rate, the above described common practice still has the other drawback of requiring the permanent control of a highly specialised craftsman. If indeed too much matte is drawn off, there is some slag penetrating into the matte compartment. On the other hand, if a too small quantity of matte has been drawn off, it will be carried along immoderately with the slag through the weir of the settling compartment. The bullion level is also subject to a close control, because if it rises up to the partition, there will no longer be any separation between matte and bullion.

The object of the present invention is to make the separation of the phases less complex, more complete and less subject to human factor. In the specific case of the slag-matte-bullion separation, the present invention enables to do without slag carriages, to avoid production of slag scale, of slag rich in matte and in bullion and of matte dross, with at the same time a less elaborate supervision than required by the common practice.

The present invention relates to a process for the separation of three liquid metallurgical phases by decantation, comprising:

(a) introducing the phases to be separated in a first vessel and allowing them to separate therein by gravity in an upper layer consisting of phase with lowest density, an intermediary layer consisting of phase with intermediary density and a lower layer consisting of phase with highest density, (b) allowing phase with intermediary density and phase with highest density to flow from the first vessel into a second vessel through a passage connecting the lower part of the first vessel with the lower part of the second vessel, (c) allowing phase with lowest density to flow from the first vessel over a first weir, (d) allowing phase with intermediary density and phase with highest density to flow from the second vessel over a second weir provided at such a level L above the level L' of the top of the passage that $(L - L')$ equals to $(g_1/g_3) h_1 + g_2/g_3) h_2$, $g_1$, $g_2$, and $g_3$ being respectively the density of the phase with lowest density, the density of the phase with intermediary density and the density of the phase with the highest density, $(h_1 + h_2)$ being the difference between the level of the first weir and L', $h_1$ being the desired layer thickness of the phase with lowest density in the first vessel and $h_2$ being positive, and (e) collecting the phases flowing over the second weir and separating them by decantation.

Once, after a short start-up period, that process runs in normal operation, only step (e) still requires human intervention.

Layer thickness $h_1$ is preferably chosen between 5 and 25 cm, because if this thickness is lower than 5 cm, the separation of the phases might be less good and if this thickness exceeds 25 cm, phase with lowest density (e.g. slag) might solidify in the first vessel.

In order to extend as long as possible the time the phase with the lowest density stays in the first vessel, this phase leaves preferably that vessel in a direction which differs substantially from the one in which the phases to be separated arrive in that vessel.

It is also useful to let the phase with lowest density, which left the first vessel, pass through another settling zone before transforming it into an end product in order to get that product almost free from other phases.

The phases leaving the second vessel are separated from each other, preferably in a place near to that vessel, specially with a view to economise transport and to facilitate the atmospheric pollution fight.

Advantageously, the separation of the phases leaving the second vessel comprises:

(a') introducing them in a third vessel and allowing them to separate therein by gravity in an upper layer consisting of phase with intermediary density and a lower layer consisting of phase with highest density, (b') allowing phase with intermediary density to flow from the third vessel over a weir, and (c') tapping phase with highest density from the third vessel through a taphole.

The following example will illustrate more clearly the process of this invention and its advantages. This example relates to the separation of the slag (density: 3.2 to 3.6 g/cm3), matte (density: 5.4 to 6.0 g/cm3) and bullion (density: nearly 9 g/cm3) phases produced in a lead shaft-furnace.

Figure 2:
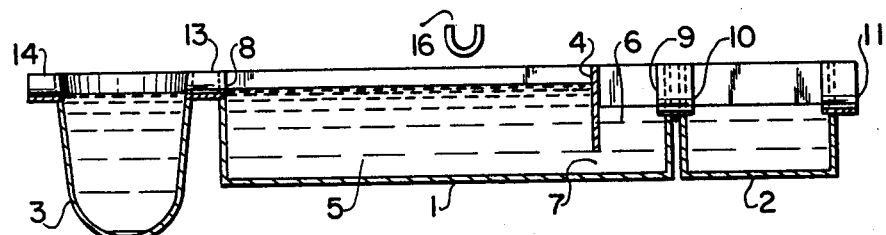

It is illustrated by the accompanying drawings in which:

FIG. 1 is a diagrammatic representation of a top view of a decantation unit used for carrying out the process of this invention, and FIG. 2 gives a vertical section of the same unit according to the x—x line of FIG. 1.

Referring to these figures, the decantation unit consists of a settler 1 to separate the slag from both matte and bullion, a settler 2 to separate the matte from the bullion and a settler 3 to treat the slag leaving settler 1.

Settler 1 is subdivided by partition 4 into compartment 5 and compartment 6 communicating by means of inferior passage 7, being 15 cm high; compartment 5 is the proper settling chamber and compartment 6 is used for the removal of matte and bullion. Compartment 5 is equipped with weir 8 for slag: the difference of level between weir 8 and the top of passage 7 amounts to 41.5 cm. Compartment 6 is equipped with weir 9 for matte and bullion, the difference of level with the top of passage 7 amounts here to 21.5 cm; this difference has been computed with the above indicated formula, while fixing the desired thickness of the slag layer to 15 cm.

Settler 2, connected to weir 9 of settler 1 by means of launder 10, is equipped with a weir 11 for matte and near its bottom with three tap-holes 12 for bullion.

Settler 3, connected to weir 8 of settler 1 by means of launder 13, is equipped with a weir 14 for slag and with a tap-hole 15 for matte.

The above plant operates as follows. The phases to be separated arrive through launder 16 of the shaft-furnace in compartment 5, where they separate by gravity. After a short start-up time during which settler 1 is filled and at the beginning of which it is useful to plug up temporarily passage 7 in order to avoid that slag would get into compartment 6, settler 1 will soon operate at normal rate, which means that it will constantly try to achieve following equilibrium by having slag removed in 8, matte and bullion in 9: a 15 cm thick bullion layer on the common bottom of compartments 5 and 6, topped with a 26.5 cm matte layer and a 15 cm slag layer in compartment 5 and with a 21.5 cm bullion layer in compartment 6.

Separation of the matte-bullion mixture overflowing in 9 occurs in settler 2 from where matte drains off in 11 and from where bullion is intermittently tapped in 12. This bullion which is substantially free of matte, has not to be drossed.

Further decantation of slag overflowing in 8 occurs in settler 3, from where decanted slag drains off in 14 and from where from time to time (usually 2 or 3 times per shift) matte is tapped in 15. The slag produced in this way is always substantially free of matte and bullion (0.40% matte and 0.20% Pb).

It is obvious that in comparison with the above described common practice, the process of the present invention presents many advantages, such as elimination of quite a number of return products (rich slag, scale slag, matte from the slag carriages and matte dross), elimination of a considerable number of jobs (at the slag carriages and at the bullion drossing), and simplification of the control at the decantation plant.

What we claim is:

1. A process for separating three liquid metallurgical phases by decantation, comprising:

(a) introducing the three liquid phases to be separated in a first settling zone and allowing them to separate therein by gravity into an upper layer consisting of the phase with the lowest density, an intermediate layer consisting of the phase with the intermediate density, and a lower layer consisting of the phase with the highest density, (b) allowing the phase with the intermediate density and the phase with the highest density to flow from said first settling zone into a second settling zone through a passage connecting the lower part of the first settling zone with the lower part of said second settling zone, (c) allowing the phase with lowest density to flow from said first settling zone over a first weir, (d) allowing the phase with the intermediate density and the phase with the highest density to flow from said second settling are over a second weir provided at such a level L above the level L' of the top of said passage so that $(L - L')$ equals to $(g1h1/g3) + (g2h2/g3)$, $g1$, $g2$ and $g3$ being respectively the density of the phase with lowest density, the density of the phase with intermediate density, and the density of the phase with the highest density, $(h1 + h2)$ being the difference between the level of the first weir and L', $h1$ being the desired layer thickness of the phase with lowest density in the first vessel and $h2$ being positive, and (e) collecting the phases flowing over the second weir and separating them by decantation.

2. A process according to claim 1 wherein $h1$ is comprised between 5 and 25 cm.

3. A process according to claim 1 wherein the phase with lowest density leaves the first separation zone in a direction which differs substantially from that in which the phases to be separated arrive in that zone.

4. A process according to claim 1 wherein the phase with the lowest density leaving the first settling zone is passed into a third settling zone.

5. A process according to claim 1 wherein the phases leaving the second settling zone are separated from each other in the vicinity of that zone.

6. A process according to claim 1 wherein the separation of the phases leaving the second settling zone comprises:

(a') introducing them in a fourth separation zone and allowing them to separate therein by gravity into an upper layer consisting of phase with intermediate density and a lower layer consisting of a phase with the highest density, (b') allowing phase with intermediate density to flow from the fourth separation zone over a weir, and (c') tapping phase with highest density from said fourth separation zone through a taphole.

7. A process according to claim 1 wherein the phases to be separated are the slag, matte and bullion phases produced in a reducing furnace for lead bearing materials.

* * * * *